(12) United States Patent
Park et al.

(10) Patent No.: US 11,181,900 B2
(45) Date of Patent: Nov. 23, 2021

(54) AGRICULTURAL WORK VEHICLE AND SYSTEM AND METHOD FOR MONITORING STATE OF AGRICULTURAL WORK VEHICLE

(71) Applicant: LS MTRON LTD., Anyang-si (KR)

(72) Inventors: Ji Yeong Park, Anyang-si (KR); Kyung Nyung Woo, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 101 days.

(21) Appl. No.: 16/631,361

(22) PCT Filed: May 4, 2018

(86) PCT No.: PCT/KR2018/005169
§ 371 (c)(1),
(2) Date: Jan. 15, 2020

(87) PCT Pub. No.: WO2019/022348
PCT Pub. Date: Jan. 31, 2019

(65) Prior Publication Data
US 2020/0217263 A1    Jul. 9, 2020

(30) Foreign Application Priority Data

Jul. 26, 2017   (KR) .................. 10-2017-0094656
May 2, 2018    (KR) .................. 10-2018-0050868

(51) Int. Cl.
*G01M 15/04*    (2006.01)
*G05B 23/02*    (2006.01)
(Continued)

(52) U.S. Cl.
CPC .......... *G05B 23/0267* (2013.01); *F01M 1/20* (2013.01); *F01P 11/16* (2013.01); *G01M 15/048* (2013.01);
(Continued)

(58) Field of Classification Search
CPC ............................. F01P 11/16; G01M 15/048
See application file for complete search history.

(56) References Cited

U.S. PATENT DOCUMENTS 4,926,331 A * 5/1990 Windle ................. G06F 3/0489
340/438
2002/0179066 A1* 12/2002 Matsumoto ........ F02M 25/0809
123/520

(Continued)

FOREIGN PATENT DOCUMENTS

| JP | H10155327 A | 6/1998 |
|----|-------------|--------|
| KR | 101318168 B1 | 10/2013 |
| KR | 101683242 B1 | 12/2016 |

OTHER PUBLICATIONS

International Search Report for related International Application No. PCT/KR2018/005169; report dated Jan. 31, 2019; (5 pages).

(Continued)

*Primary Examiner* — Eric S. McCall
(74) *Attorney, Agent, or Firm* — K&L Gates LLP

(57) ABSTRACT

An agricultural work vehicle according to an aspect of the invention that can monitor a state of the agricultural work vehicle when the agricultural work vehicle performs agricultural work using a working machine which is attached thereto includes: a vehicle body; a working machine that is attached to the front or rear of the vehicle body and performs agricultural work; an engine that generates a driving force for movement of the vehicle body and work of the working machine; and a monitoring device that determines at least one of whether there is an abnormality in a temperature of a coolant for cooling the engine, whether there is an abnormality in a pressure of an engine oil supplied to the engine, and whether there is an abnormality in the engine when the working machine performs work using the driving force.

7 Claims, 8 Drawing Sheets

(51) Int. Cl.
*F01M 1/20* (2006.01)
*F01P 11/16* (2006.01)
*G01M 15/05* (2006.01)
*G01M 15/09* (2006.01)
*G06Q 50/02* (2012.01)

(52) U.S. Cl.
CPC ............ *G01M 15/05* (2013.01); *G01M 15/09* (2013.01); *G06Q 50/02* (2013.01); *F01M 2250/62* (2013.01); *F01M 2250/64* (2013.01)

(56) References Cited

U.S. PATENT DOCUMENTS

| | | | |
|---|---|---|---|
| 2002/0194902 A1* | 12/2002 | Gehner | F02M 31/16 73/114.39 |
| 2008/0196700 A1* | 8/2008 | Chyo | F02M 31/20 123/541 |
| 2019/0078527 A1* | 3/2019 | Kim | F02D 41/2403 |

OTHER PUBLICATIONS

Written Opinion for related International Application No. PCT/KR2018/005169; report dated Jan. 31, 2019; (7 pages).

* cited by examiner

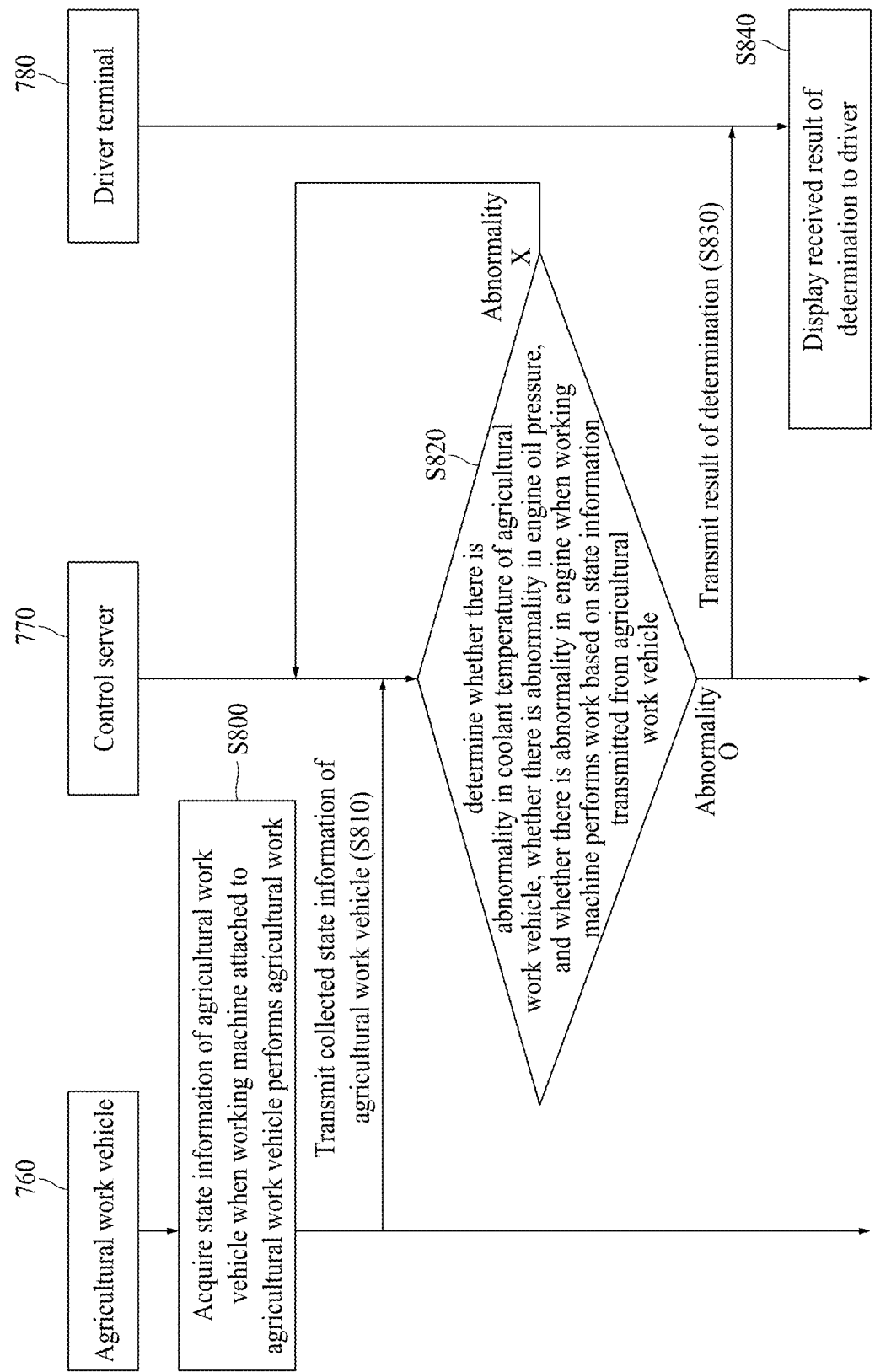

AGRICULTURAL WORK VEHICLE AND SYSTEM AND METHOD FOR MONITORING STATE OF AGRICULTURAL WORK VEHICLE

CROSS-REFERENCE TO RELATED APPLICATIONS

The present application is a National Stage of International Application No. PCT/KR2018/005169, filed May 4, 2018, which claims priority to Korean Application No. 10-2017-0094656 filed on Jul. 26, 2017, Korean Application No. 10-2018-0050868 filed on May 2, 2018, the disclosure of which are incorporated herein by reference.

FIELD OF THE INVENTION

The invention relates to an agricultural work vehicle and more particularly to monitoring a state of an agricultural work vehicle.

BACKGROUND OF THE INVENTION

An agricultural work vehicle is used to cultivate crops which are required for human life using a land. Examples of an agricultural work vehicle include a combine and a tractor. A combine is a vehicle that performs work of cutting and threshing crops such as rice, barley, wheat, and bean. A tractor is a vehicle that can have various types of working machines connected thereto and performs agricultural work in a traveling or stopped state. The tractor performs agricultural work by connecting a working machine to a hitch mounted on the tractor and raising or lowering the hitch using a hydraulic device.

Since such an agricultural work vehicle is generally exposed to and used in environments which are poorer and rougher than those for normal automobiles, the agricultural work vehicle is likely to be subjected to failure due to environmental conditions or external physical forces.

Particularly, since an agricultural work vehicle generally performs agricultural work using a driving force of an engine, the state of the agricultural work vehicle can further deteriorate at the time of performing agricultural work and a risk of malfunction can increase. Accordingly, the state of an agricultural work vehicle needs to be monitored to prevent occurrence of malfunction of the agricultural work vehicle.

However, most prior art documents disclose only techniques of monitoring a state of a general car, which cannot be applied to an agricultural work vehicle that performs agricultural work using a driving force of an engine without any change.

BRIEF SUMMARY OF THE INVENTION

The invention is made to solve the above-mentioned problems, and a technical objective thereof is to provide an agricultural work vehicle that can monitor a state of the agricultural work vehicle when the agricultural work vehicle performs agricultural work using a working machine which is attached thereto.

Another technical objective of the invention is to provide a system and a method for monitoring a state of an agricultural work vehicle that can remotely monitor the states of a plurality of agricultural work vehicles.

Still another technical objective of the invention is to provide a system and a method for monitoring a state of an agricultural work vehicle that can track a position of the agricultural work vehicle.

In order to achieve the above-mentioned objectives, according to an aspect of the invention, there is provided an agricultural work vehicle including: a vehicle body (110); a working machine (200) that is attached to the front or rear of the vehicle body (110) and performs agricultural work; an engine (120) that generates a driving force for movement of the vehicle body (100) and work of the working machine (200); and a monitoring device (177) that determines at least one of whether there is an abnormality in a temperature of a coolant for cooling the engine (120), whether there is an abnormality in a pressure of an engine oil supplied to the engine 120, and whether there is an abnormality in the engine (120) when the working machine (200) performs work using the driving force.

In order to achieve the above-mentioned objectives, a system (750) for monitoring a state of an agricultural work vehicle according to another aspect of the invention includes a control server (770) that monitors one or more agricultural work vehicles (760). In this aspect, the control server (770) includes: a state information receiving device (910) that receives state information of an agricultural work vehicle (760) from one or more agricultural work vehicles (760) when a working machine (890) attached to the agricultural work vehicle (760) performs agricultural work; a monitoring device (925) that determines at least one of whether there is an abnormality in a temperature of a coolant for the agricultural work vehicle (760), whether there is an abnormality in a pressure of an engine oil, and whether there is an abnormality in an engine (820) when the working machine (890) performs work based on the state information; and a determination result transmitting device (950) that transmits a result of determination to a driver terminal (780) of the agricultural work vehicle when it is determined that an abnormality occurs in at least one of the temperature of the coolant, the pressure of the engine oil, and the engine (820).

In the aspects, the monitoring device (177) may determine that an abnormality occurs in the temperature of the coolant to the work of the working machine (200) when a current temperature of the coolant is greater than a coolant temperature upper-limit value and a current load of the engine (120) is greater than an engine load upper-limit value or a current rotation speed of the engine (120) is greater than an engine rotation speed upper-limit value at the time of work of the working machine (200).

The monitoring device (177, 925) may determine that an abnormality occurs in the pressure of the engine oil due to the work of the working machine (200) when a current pressure of the engine oil is less than an engine oil lower-limit value and a current load of the engine (120) is greater than an engine load upper-limit value or a current rotation speed of the engine (120) is greater than an engine rotation speed upper-limit value at the time of work of the working machine (200) using the driving force.

On the other hand, the monitoring device (177, 925) may determine that an abnormality occurs in the engine 120 due to the work of the working machine (200) when it is determined that an amount of moisture included in fuel is greater than an intra-fuel moisture upper-limit value or a current temperature of the fuel is greater than a fuel temperature upper-limit value or the current temperature of the fuel is less than a fuel temperature lower-limit value, and a current temperature of the coolant is greater than a coolant temperature upper-limit value or a current load of the engine (120) is greater than an engine load upper-limit value or a current rotation speed of the engine (120) is greater than an engine rotation speed upper-limit value or a current pressure of the engine oil is less than an engine oil pressure lower-limit value at the time of work of the working machine (200) using the driving force.

On the other hand, the monitoring device (177, 925) may calculate a difference between an outside air temperature of a place in which the agricultural work vehicle (100) is located and a current temperature of the coolant and determine that an abnormality occurs in the temperature of the coolant when the difference departs from a predetermined normal range.

The state information may include at least one of a current temperature of the coolant, a current load of the engine (120, 820), a current engine rotation speed of the engine (120, 820), a current pressure of the engine oil, an amount of moisture in fuel supplied to the engine, and a current temperature of the fuel which are acquired when the working machine (890) performs work.

In order to achieve the above-mentioned objectives, according to a still another aspect of the invention, there is provided a method for monitoring a state of an agricultural work vehicle, the method including: causing an agricultural work vehicle (760) to acquire state information of the agricultural work vehicle (760) when a working machine (890) attached to the agricultural work vehicle (760) performs agricultural work; causing the agricultural work vehicle (760) to transmit the state information of the agricultural work vehicle (760) to a control server (770); causing the control server (770) to determine at least one of whether there is an abnormality in a temperature of a coolant for the agricultural work vehicle (760), whether there is an abnormality in a pressure of an engine oil, and whether there is an abnormality in an engine (820) when the working machine (890) performs work based on the state information; causing the control server (770) to transmit a result of determination to a driver terminal (780) of the agricultural work vehicle when it is determined that an abnormality occurs in at least one of the temperature of the coolant, the pressure of the engine oil, and the engine (820); and causing the driver terminal (780) to display the result of determination received from the control server (770) to a driver.

According to the invention, by monitoring the state of an agricultural work vehicle when the agricultural work vehicle performs agricultural work using a working machine which is attached to the agricultural work vehicle, it is possible to predict a possibility of occurrence of malfunction of an agricultural work vehicle and to prevent occurrence of malfunction of the agricultural work vehicle.

According to the invention, by remotely monitoring the states of a plurality of agricultural work vehicles, determining the states of the agricultural work vehicles, and notifying an owner of the agricultural work vehicles of the result of determination, the owner of the agricultural work vehicles can more conveniently manage the agricultural work vehicles.

According to the invention, tracking a position of each agricultural work vehicle, it is possible to prevent a risk of theft of the agricultural work vehicle.

BRIEF DESCRIPTION OF THE DRAWINGS

FIG. 8 is a flowchart illustrating a state monitoring method for an agricultural work vehicle according to an embodiment of the invention.

DETAILED DESCRIPTION OF THE INVENTION

Meanings of terms which are described in this description should be understood as follows.

A term in a singular form should be understood to include a plural form unless defined clearly different. The terms "first," "second," etc. may be used herein to distinguish one element from another, and the scope of the invention is not limited to the terms.

The terms 'include' and 'have' should be understood not to exclude a possibility of presence or addition of one or more other features, numerals, operations, elements, parts, or combinations thereof.

The term "at least one" should be understood as including any and all combinations of one or more of the associated listed items. For example, the meaning of "at least one of a first item, a second item, and a third item" denotes combinations of all items proposed from two or more of the first item, the second item, and the third item as well as the first item, the second item, or the third item.

Hereinafter, exemplary embodiments of the invention will be described in detail with reference to the accompanying drawings.

Figure 1:
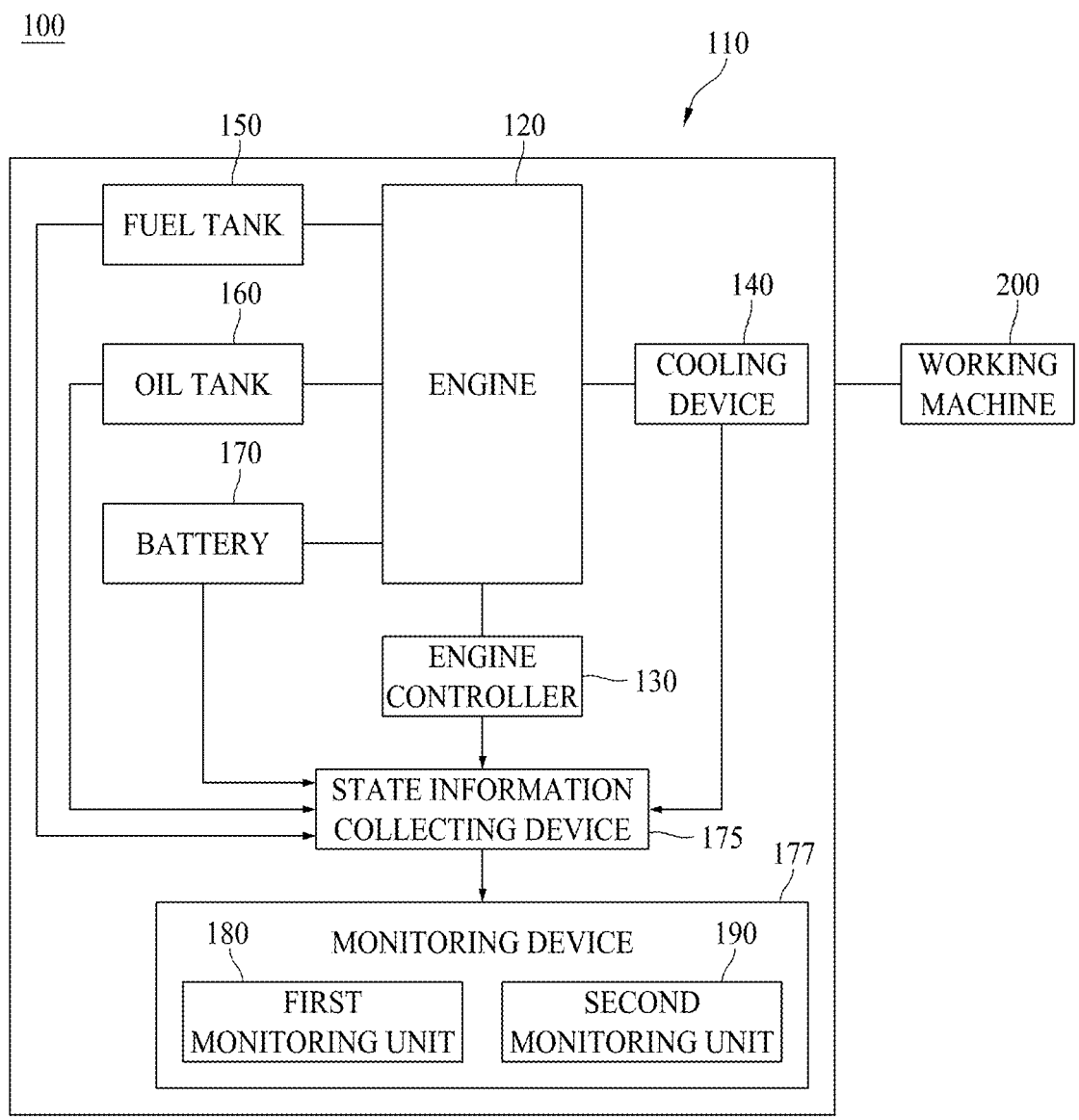
FIG. 1 is a block diagram schematically illustrating a configuration of an agricultural work vehicle according to an embodiment of the invention.
Figure 2:
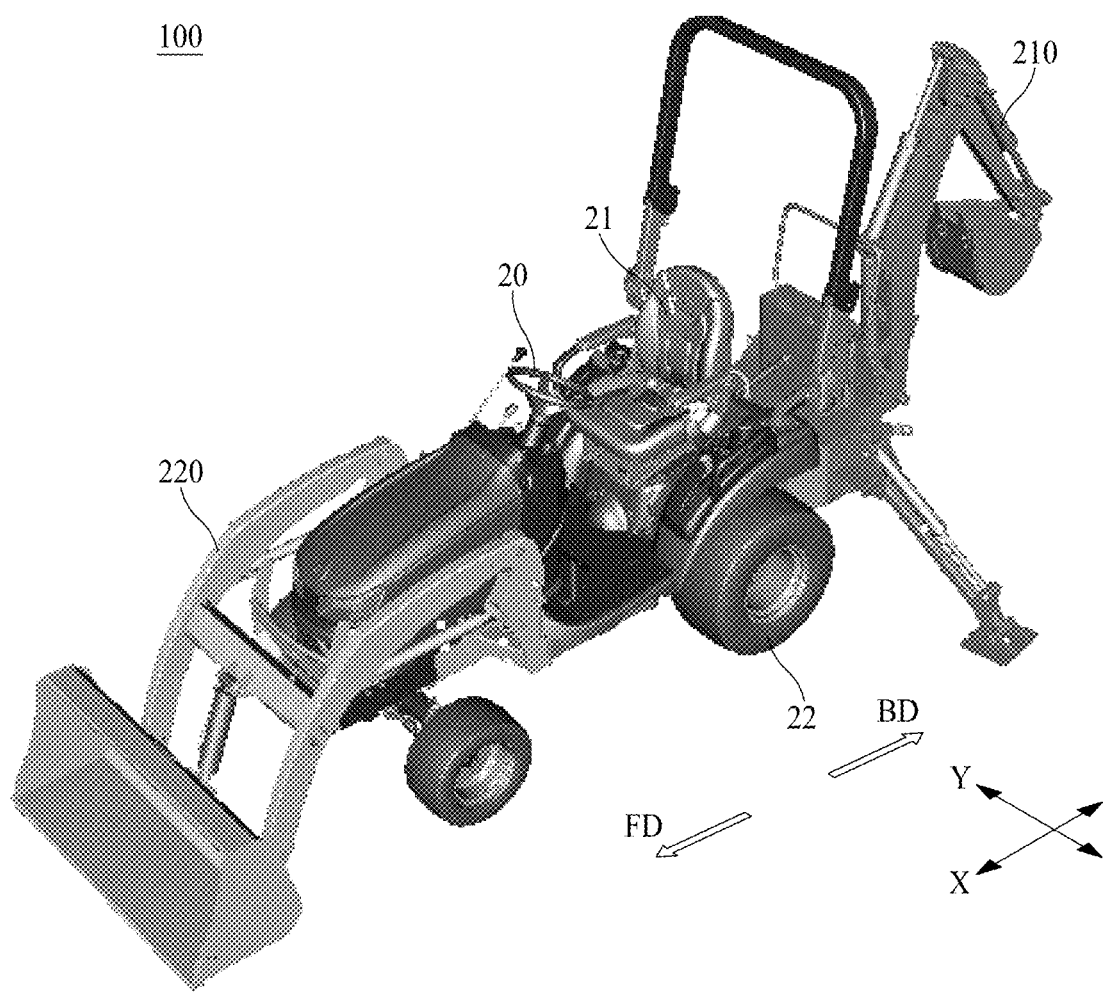
FIG. 2 is a diagram illustrating an example of the agricultural work vehicle according to the embodiment of the invention.

FIG. 1 is a block diagram schematically illustrating a configuration of an agricultural work vehicle according to an embodiment of the invention. FIG. 2 is a diagram illustrating an example of the agricultural work vehicle according to the invention.

Referring to FIGS. 1 and 2, an agricultural work vehicle 100 according to the invention performs agricultural work using various working machines which are attached to the agricultural work vehicle 100 in a state in in which it travels or stops on a farmland. For example, the agricultural work vehicle 100 may be a combine or a tractor as illustrated in FIG. 2. A tractor is a vehicle that has various types of working machines (for example, a rotary or a plow) connected thereto and performs agricultural work in a traveling or stopping state.

Referring to FIG. 1, the agricultural work vehicle 100 includes a vehicle body 110, an engine 120, an engine controller 130, a cooling device 140, a fuel tank 150, an oil tank 160, a battery 170, a state information collecting device 175, a monitoring device 177, and a working machine 200.

The vehicle body 110 serves to support the engine 120, the engine controller 130, the cooling device 140, the fuel tank 150, the oil tank 160, the battery 170, the state information collecting device 175, the monitoring device 177, and the working machine 200. A driver seat 21 is provided in the vehicle body 110 as illustrated in FIG. 2. When a driver sits on the driver seat 21 which is provided in the vehicle body 110 and operates a steering device 20, an operation device, or the like, the agricultural work vehicle 100 according to the invention can perform predetermined agricultural work. Wheels 22 are provided in the vehicle body 110. By allowing the engine 120 to rotate the wheels 22 using fuel which is supplied from the fuel tank 150, the vehicle body 110 can move in a traveling direction (an X-axis direction). In this case, the traveling direction (the X-axis direction) may be an axial direction which is parallel to a forward direction in which the vehicle body 110 moves forward (a direction of an arrow FD) and a rearward direction in which the vehicle body 110 moves rearward (a direction of an arrow BD). Although not illustrated, a transmission that connects the engine 120 and the wheels 22 may be provided in the vehicle body 110.

The engine 120 is provided in the vehicle body 110. The engine 120 generates a driving force for traveling of the vehicle body 110 and work of a working machine 200 using fuel which is supplied from the fuel tank 150. For example, the engine 120 is provided in the vehicle body 110 in a state in which it is accommodated in an engine accommodation section (not illustrated).

The engine controller 130 controls the engine 120 such that the engine 120 generates a driving force for traveling of the agricultural work vehicle 100 and work of a working machine 200. For example, the engine controller 130 supplies output information of the engine 120 to the state information collecting device 175 when the working machine 200 performs work using the driving force of the engine 120.

For example, the engine output information which is supplied to the state information collecting device 175 by the engine controller 130 includes an engine load and an engine rotation speed (RPM).

The cooling device 140 cools the engine 120 using a coolant and cools the coolant which has been heated by heat generated from the engine 120 using a radiator (not illustrated).

The fuel tank 150 is provided in the vehicle body 110. The fuel tank 150 stores fuel which is supplied to the engine 120.

The oil tank 160 is provided in the vehicle body 110. The oil tank 160 stores an engine oil which is supplied to the engine 120. The oil tank 160 continuously supplies and circulates a predetermined amount of engine oil to the engine 120. The engine oil forms a thin film in a slide portion such as a piston or a cylinder or a rotary portion such as a crankshaft or a bearing to decrease frictional resistance and performs a sealing function of sealing a small gap between a piston ring and a cylinder or the like to transmit energy to the crankshaft without any loss. The engine oil performs a cooling function of absorbing heat of a high-temperature portion while circulating in the engine 120 and also functions to prevent corrosion in the engine 120, to filter metal powder generated from the slide portion or the rotary portion using an oil filter, to prevent impurities such as carbon generated due to combustion of the fuel from be deposited in the slide portion or the rotary portion, and to clean the inside of the engine 120.

The battery 170 supplies electric energy for starting the engine 120 and supplies electric energy for driving electronic components which are mounted in the agricultural work vehicle 100.

The state information collecting device 175 collects state information of the agricultural work vehicle 100 and supplies the collected state information to the monitoring device 177. For example, the state information collected by the state information collecting device 175 includes a current temperature of a coolant, a current load of the engine 120, a current rotation speed of the engine 120, a current pressure of the engine oil, an amount of moisture in the fuel supplied to the engine 120, and a temperature of the fuel supplied to the engine 120 which are acquired when the working machine 200 performs work using the driving force of the engine 120.

The state information may further include an outside air temperature of a place in which the agricultural work vehicle 100 is located, a voltage of the battery 170, a level of urea water, and quality of urea water.

On the other hand, reference values of the state information for determining whether there is an abnormality in the agricultural work vehicle 100 are stored in a database (not illustrated). For example, the database may store a coolant temperature upper-limit value, a coolant temperature lower-limit value, an engine load upper-limit value, an engine rotation speed upper-limit value, an engine oil pressure lower-limit value, an intra-fuel moisture upper-limit value, a fuel temperature upper-limit value, a fuel temperature lower-limit value, a normal range of a difference between the current temperature of the coolant and the outside air temperature, a battery voltage upper-limit value, a battery voltage lower-limit value, a normal range of a storage capacity of urea water, a urea water quantity upper-limit value, an urea water quality lower-limit value.

The monitoring device 177 determines whether there is an abnormality in the agricultural work vehicle 100 based on the state information which is acquired when the working machine 200 performs work using the driving force of the engine 120 or general state information of the agricultural work vehicle 100. For example, the monitoring device 177 includes a first monitoring unit 180 and a second monitoring unit 190.

The first monitoring unit 180 determines at least one of whether there is an abnormality in the temperature of the coolant, whether there is an abnormality in the engine oil pressure, and whether there is an abnormality in the engine 120 based on the state information which is acquired when the working machine 200 performs work using the driving force of the engine 120.

When it is determined that an abnormality occurs in the coolant temperature, an abnormality occurs in the engine oil pressure, or an abnormality occurs in the engine 120 while the working machine 200 is performing work, the first monitoring unit 180 notifies a driver via an instrument panel of the agricultural work vehicle 100 or a particular display device.

For example, the first monitoring unit 180 can determine whether there is an abnormality in the coolant temperature using at least one of the current temperature of the coolant, the coolant temperature upper-limit value, the current load of the engine 120, the engine load upper-limit value, the current rotation speed of the engine 120, and the engine rotation speed upper-limit value.

Specifically, the first monitoring unit 180 can determine that an abnormality occurs in the coolant temperature due to work of the working machine 200 when the current temperature of the coolant is greater than the coolant temperature upper-limit value and the current load of the engine 120 is greater than the engine load upper-limit value while the working machine 200 is performing work.

The first monitoring unit 180 can determine that an abnormality occurs in the coolant temperature due to work of the working machine 200 when the current temperature of the coolant is greater than the coolant temperature upper-limit value and the current rotation speed of the engine 120 is greater than the engine rotation speed upper-limit value while the working machine 200 is performing work.

For example, the first monitoring unit 180 can determine whether there is an abnormality in the engine oil pressure using at least one of the current pressure of the engine oil, the engine oil pressure lower-limit value, the current load of the engine 120, the engine load upper-limit value, the current rotation speed of the engine 120, and the engine rotation speed upper-limit value while the working machine 200 is performing work.

Specifically, the first monitoring unit 180 can determine that the engine oil pressure is low due to work of the working machine 200 when the current pressure of the engine oil is less than the engine oil pressure lower-limit value and the current load of the engine 120 is greater than the engine load upper-limit value while the working machine 200 is performing work using a driving force.

The first monitoring unit 180 can determine that the engine oil pressure is low due to work of the working machine 200 when the current pressure of the engine oil is less than the engine oil pressure lower-limit value and the current rotation speed of the engine 120 is greater than the engine rotation speed upper-limit value while the working machine 200 is performing work.

For example, the first monitoring unit 180 can determine whether there is an abnormality in the engine oil pressure using at least one of the current temperature of the coolant, the coolant temperature upper-limit value, the current load of the engine 120, the engine load upper-limit value, the current rotation speed of the engine 120, the engine rotation speed upper-limit value, the current pressure of the engine oil, the engine oil pressure lower-limit value, the current amount of moisture in the fuel, the intra-fuel moisture upper-limit value, the current temperature of the fuel, the fuel temperature upper-limit value, and the fuel temperature lower-limit value while the working machine 200 is performing work.

Specifically, when it is determined that the current temperature of the coolant is greater than the coolant temperature upper-limit value, the current load of the engine 120 is greater than the engine load upper-limit value, the current rotation speed of the engine 120 is greater than the engine rotation speed upper-limit value, or the current pressure of the engine oil is less than the engine oil pressure lower-limit value, and the current amount of moisture in the fuel is greater than the intra-fuel moisture upper-limit value, the first monitoring unit 180 can determine that an abnormality occurs in the engine 120 due to work of the working machine 200.

When the current temperature of the coolant is greater than the coolant temperature upper-limit value, the current load of the engine 120 is greater than the engine load upper-limit value, the current rotation speed of the engine 120 is greater than the engine rotation speed upper-limit value, or the current pressure of the engine oil is less than the engine oil pressure lower-limit value, and the current temperature of the fuel is greater than the fuel temperature upper-limit value or the current temperature of the fuel is less than the fuel temperature lower-limit value, the first monitoring unit 180 can determine that an abnormality occurs in the engine 120 due to work of the working machine 200.

An example of the first monitoring unit 180 that performs the above-mentioned functions will be more specifically described below with reference to FIGS. 3 and 4.

Figure 3:
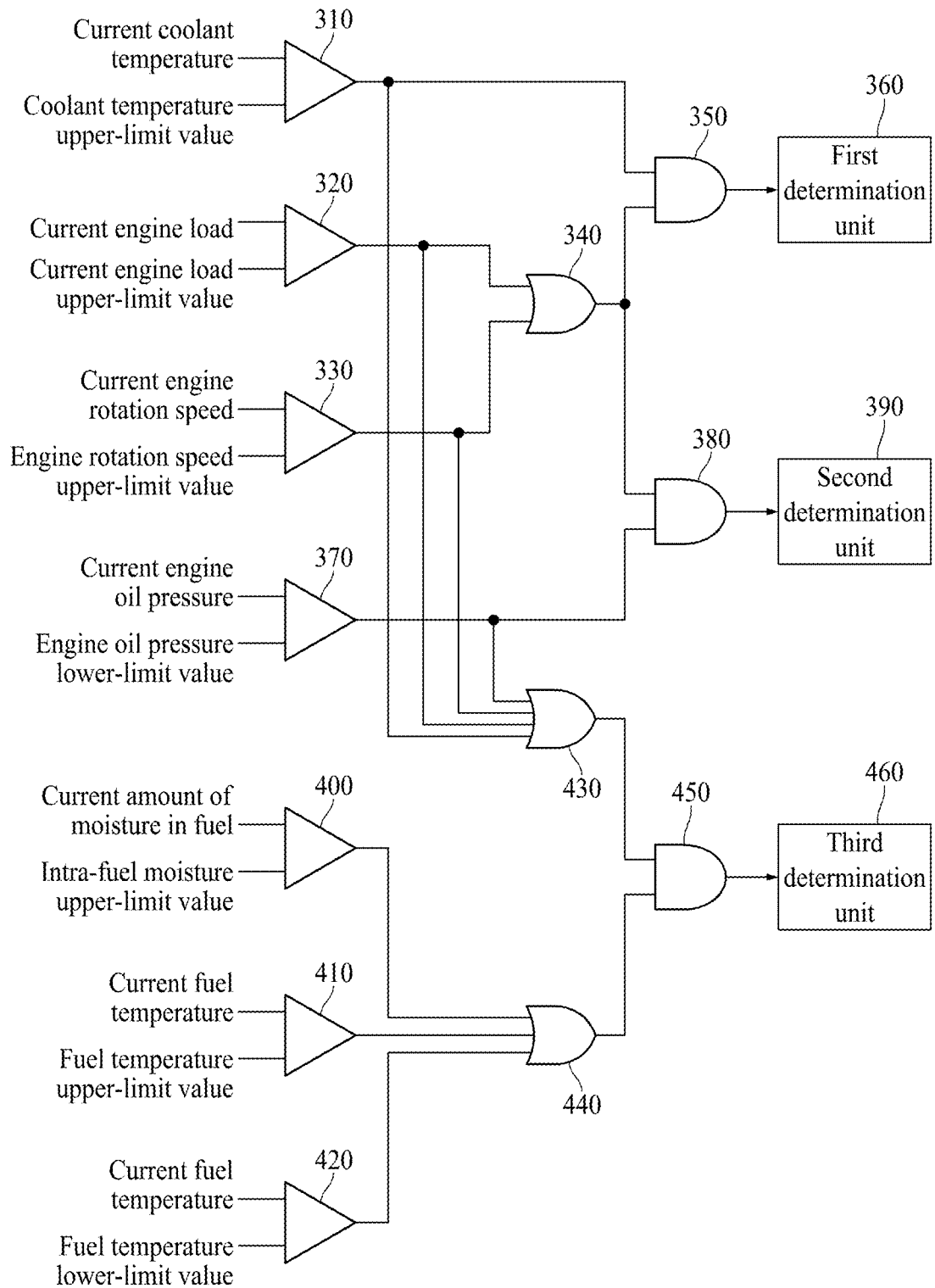
FIG. 3 is a block diagram schematically illustrating a configuration of a first monitoring unit according to a first embodiment of the invention.

FIG. 3 is a block diagram illustrating an example of a first monitoring unit according to a first embodiment of the invention. As illustrated in FIG. 3, the first monitoring unit 180 according to the first embodiment includes a first comparator 310, a second comparator 320, a third comparator 330, a first OR gate 340, a first AND gate 350, and a first determining unit 360.

The first comparator 310 compares a current temperature of the coolant with a predetermined coolant temperature upper-limit value. The first comparator 310 outputs a first value (for example, 1) when the current temperature of the coolant is greater than the coolant temperature upper-limit value, and outputs a second value (for example, 0) when the current temperature of the coolant is not greater than the coolant temperature upper-limit value.

The second comparator 320 compares a current load of the engine 120 with a predetermined engine load upper-limit value. The second comparator 320 outputs a first value (for example, 1) when the current load of the engine 120 is greater than the engine load upper-limit value, and outputs a second value (for example, 0) when the current load of the engine 120 is not greater than the engine load upper-limit value.

The third comparator 330 compares a current rotation speed of the engine 120 with a predetermined engine rotation speed upper-limit value. The third comparator 330 outputs a first value (for example, 1) when the current rotation speed of the engine 120 is greater than the engine rotation speed upper-limit value, and outputs a second value (for example, 0) when the current rotation speed of the engine 120 is not greater than engine rotation speed upper-limit value.

The first OR gate 340 performs an OR operation on the output of the second comparator 320 and the output of the third comparator 330 and outputs the result of operation to the first AND gate 350. Specifically, the first OR gate normally outputs a first value when any one of the second comparator 320 and the third comparator 330 outputs the first value, and outputs a second value only when both the second comparator 320 and the third comparator 330 output the second value.

The first AND gate 350 performs an AND operation on the output of the first OR gate 340 and the first comparator 310 and outputs the result of operation to the first determination unit 360. Specifically, the first AND gate 350 outputs a first value only when both the first OR gate 340 and the first comparator 310 output the first value, and normally outputs a second value when any one of the first OR gate 340 and the first comparator 310 outputs the second value.

The first determination unit 360 determines that an abnormality occurs in the coolant temperature when the first value is output from the first AND gate 350. That is, when the load of the engine 120 increases or the rotation speed of the engine 120 increases due to work of the working machine 200 and thus the coolant temperature becomes high, the first determination unit 360 determines that an abnormality occurs in the coolant temperature due to work of the working machine 200 and notifies the driver of the result. Accordingly, the driver can prevent malfunction of the agricultural work vehicle 100 due to a work load by temporarily stopping driving of the working machine 200.

On the other hand, the first monitoring unit 180 according to the invention may further include a fourth comparator 370, a second AND gate 380, and a second determination unit 390 as illustrated in FIG. 3 in order to determine whether there is an abnormality in the engine oil pressure.

The fourth comparator 370 compares the current pressure of the engine oil with a predetermined engine oil pressure lower-limit value. The fourth comparator 370 outputs a first value (for example, 1) when the current pressure of the engine oil is less than the engine oil pressure lower-limit value, and outputs a second value (for example, 0) when the current pressure of the engine oil is not less than the engine oil pressure lower-limit value.

The second AND gate 380 performs an AND operation on the output of the first OR gate 340 and the fourth comparator 370 and outputs the result of operation to the second determination unit 390. Specifically, the second AND gate outputs a first value only when both the first OR gate 340 and the fourth comparator 370 output the first value, and normally outputs a second value when any one of the first OR gate 340 and the fourth comparator 370 outputs the second value.

The second determination unit 390 determines that an abnormality occurs in the engine oil pressure when the first value is output from the second AND gate 380. That is, when the load of the engine 120 increases or the rotation speed of the engine 120 increases due to work of the working machine 200 and thus the engine oil pressure becomes low, the second determination unit 390 determines that an abnormality occurs in the engine oil pressure due to work of the working machine 200 and notifies the driver of the result. Accordingly, the driver can prevent malfunction of the agricultural work vehicle 100 due to a work load by temporarily stopping driving of the working machine 200.

In the above-mentioned embodiment, the second to fourth comparators 320, 330, and 370, the first OR gate 340, and the second AND gate 380 are used to determine whether there is an abnormality in the engine oil pressure. In a modified example, the first OR gate 340 and the second AND gate 380 may be replaced with two AND gates to determine whether there is an abnormality in the engine oil pressure.

According to this modified example, the first AND gate performs an AND operation on the outputs of the second comparator 320 and the fourth comparator 370 and outputs the result of operation to the second determination unit 390. Specifically, the first AND gate outputs a first value only when both the second comparator 320 and the fourth comparator 370 output the first value, and normally outputs a second value when any one of the second comparator 320 and the fourth comparator 370 outputs the second value.

The second AND gate performs an AND operation on the outputs of the third comparator 330 and the fourth comparator 370 and outputs the result of operation to the second determination unit 390. Specifically, the first AND gate outputs a first value only when both the third comparator 330 and the fourth comparator 370 output the first value, and normally outputs a second value when any one of the third comparator 330 and the fourth comparator 370 outputs the second value.

Accordingly, the second determination unit 390 determines that an abnormality occurs in the engine oil pressure when the first value is output from the first AND gate or the first value is output from the second AND gate.

On the other hand, the first monitoring unit 180 according to the invention may further include a fifth comparator 400, a sixth comparator 410, a seventh comparator 420, a second OR gate 430, a third OR gate 440, a third AND gate 450, and a third determination unit 460 as illustrated in FIG. 3 in order to determine whether there is an abnormality in the engine 120.

The fifth comparator 400 compares the current amount of moisture in the fuel supplied to the engine 120 with a predetermined intra-fuel moisture upper-limit value. The fifth comparator 400 outputs a first value (for example, 1) when the current amount of moisture in the fuel is greater than the intra-fuel moisture upper-limit value, and outputs a second value (for example, 0) when the current amount of moisture in the fuel is not greater than the intra-fuel moisture upper-limit value.

The sixth comparator 410 compares the current temperature of the fuel with a predetermined fuel temperature upper-limit value. The sixth comparator 410 outputs a first value (for example, 1) when the current temperature of the fuel is greater than the fuel temperature upper-limit value, and outputs a second value (for example, 0) when the current temperature of the fuel is not greater than the fuel temperature upper-limit value.

The seventh comparator 420 compares the current temperature of the fuel with a predetermined fuel temperature lower-limit value. The seventh comparator 420 outputs a first value (for example, 1) when the current temperature of the fuel is less than the fuel temperature lower-limit value, and outputs a second value (for example, 0) when the current temperature of the fuel is not less than the fuel temperature lower-limit value.

The second OR gate 430 performs an OR operation on the outputs of the first to fourth comparators 310 to 370. Specifically, the second OR gate 430 outputs a first value when any one of the first to fourth comparators 310 to 370 outputs the first value, and outputs a second value when all of the first to fourth comparators 310 to 370 output the second value.

The third OR gate 440 performs an OR operation on the outputs of the fifth to seventh comparators 400 to 420. Specifically, the third OR gate 440 outputs a first value when any one of the fifth to seventh comparators 400 to 420 outputs the first value, and outputs a second value when all of the fifth to seventh comparators 400 to 420 output the second value.

The third AND gate 450 performs an AND operation on the outputs of the second OR gate 430 and the third OR gate 440 and outputs the result of operation to the third determination unit 460. Specifically, the third AND gate 450 outputs a first value only when both the second OR gate 430 and the third OR gate 440 output the first value, and normally outputs a second value when any one of the second OR gate 430 and the third OR gate 440 outputs the second value.

The third determination unit 460 determines that an abnormality occurs in the engine 120 when the first value is output from the third AND gate 450. That is, when it is determined that the current temperature of the coolant is greater than the coolant temperature upper-limit value or the current pressure of the engine oil is less than the engine oil pressure lower-limit value, the current load of the engine 120 is greater than the engine load upper-limit value, or the current rotation speed of the engine 120 is greater than the engine rotation speed upper-limit value and the current amount of moisture in the fuel is greater than the intra-fuel moisture upper-limit value, the current temperature of the fuel is greater than fuel temperature upper-limit value, or the current temperature of the fuel is less than the fuel temperature lower-limit value due to work of the working machine 200, the third determination unit 460 determines that an abnormality occurs in the engine 120 due to work of the working machine 200 and notifies the driver of the result. Accordingly, the driver can prevent malfunction of the agricultural work vehicle 100 due to a work load by temporarily stopping driving of the working machine 200.

Figure 4:
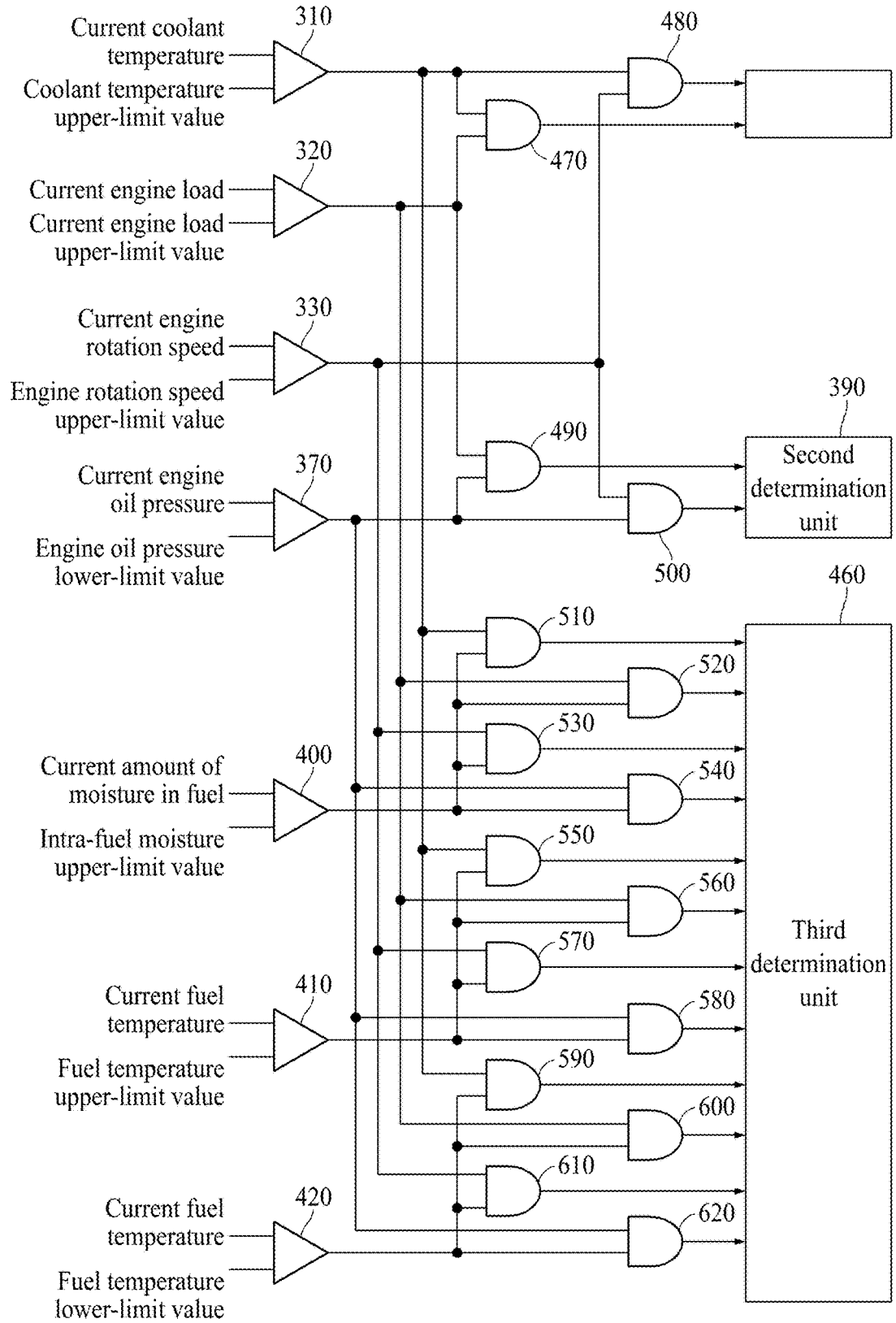
FIG. 4 is a block diagram schematically illustrating a configuration of a second monitoring unit according to a first embodiment of the invention.

FIG. 4 is a block diagram illustrating an example of a first monitoring unit according to a second embodiment of the invention. As illustrated in FIG. 4, the first monitoring unit 180 according to the second embodiment includes a first comparator 310, a second comparator 320, a third comparator 330, a fourth AND gate 470, a fifth AND gate 480, and a first determining unit 360.

The first comparator 310 compares a current temperature of the coolant with a predetermined coolant temperature upper-limit value. The first comparator 310 outputs a first value (for example, 1) when the current temperature of the coolant is greater than the coolant temperature upper-limit value, and outputs a second value (for example, 0) when the current temperature of the coolant is not greater than the coolant temperature upper-limit value.

The second comparator 320 compares a current load of the engine 120 with a predetermined engine load upper-limit value. The second comparator 320 outputs a first value (for example, 1) when the current load of the engine 120 is greater than the engine load upper-limit value, and outputs a second value (for example, 0) when the current load of the engine 120 is not greater than the engine load upper-limit value.

The third comparator 330 compares a current rotation speed of the engine 120 with a predetermined engine rotation speed upper-limit value. The third comparator 330 outputs a first value (for example, 1) when the current rotation speed of the engine 120 is greater than the engine rotation speed upper-limit value, and outputs a second value (for example, 0) when the current rotation speed of the engine 120 is not greater than engine rotation speed upper-limit value.

The fourth AND gate 470 performs an AND operation on the output of the first comparator 310 and the output of the second comparator 320 and outputs the result of operation to the first determination unit 360. Specifically, the fourth AND gate 470 outputs a first value only when both the first comparator 310 and the second comparator 320 output the first value, and normally outputs a second value when any one of the first comparator 310 and the second comparator 320 outputs the second value.

The fifth AND gate 480 performs an AND operation on the output of the first comparator 310 and the output of the third comparator 330 and outputs the result of operation to the first determination unit 360. Specifically, the fifth AND gate 480 outputs a first value only when both the first comparator 310 and the third comparator 320 output the first value, and normally outputs a second value when any one of the first comparator 310 and the third comparator 330 outputs the second value.

The first determination unit 360 determines that an abnormality occurs in the coolant temperature when the first value is output from the fourth AND gate 470 or the first value is output from the fifth AND gate 480. That is, when the load of the engine 120 increases or the rotation speed of the engine 120 increases due to work of the working machine 200 and thus the coolant temperature becomes high, the first determination unit 360 determines that an abnormality occurs in the coolant temperature due to work of the working machine 200 and notifies the driver of the result. Accordingly, the driver can prevent malfunction of the agricultural work vehicle 100 due to a work load by temporarily stopping driving of the working machine 200.

On the other hand, the first monitoring unit 180 according to the invention may further include a fourth comparator 370, a sixth AND gate 490, a seventh AND gate 500, and a second determination unit 390 as illustrated in FIG. 4 in order to determine whether there is an abnormality in the engine oil pressure.

The fourth comparator 370 compares the current pressure of the engine oil with a predetermined engine oil pressure lower-limit value. The fourth comparator 370 outputs a first value (for example, 1) when the current pressure of the engine oil is less than the engine oil pressure lower-limit value, and outputs a second value (for example, 0) when the current pressure of the engine oil is not less than the engine oil pressure lower-limit value.

The sixth AND gate 490 performs an AND operation on the output of the fourth comparator 370 and the second comparator 320 and outputs the result of operation to the second determination unit 390. Specifically, the sixth AND gate 490 outputs a first value only when both the fourth comparator 370 and the second comparator 320 output the first value, and normally outputs a second value when any one of the fourth comparator 370 and the second comparator 320 outputs the second value.

The seventh AND gate 500 performs an AND operation on the output of the fourth comparator 370 and the third comparator 330 and outputs the result of operation to the second determination unit 390. Specifically, the seventh AND gate 500 outputs a first value only when both the fourth comparator 370 and the third comparator 330 output the first value, and normally outputs a second value when any one of the fourth comparator 370 and the third comparator 330 outputs the second value.

The second determination unit 390 determines that an abnormality occurs in the engine oil pressure when the first value is output from the sixth AND gate 490 or the first value is output from the seventh AND gate 500. That is, when it is determined that the load of the engine 120 increases or the rotation speed of the engine 120 increases due to work of the working machine 200 and thus the engine oil pressure becomes low, the second determination unit 390 determines that an abnormality occurs in the engine oil pressure due to work of the working machine 200 and notifies the driver of the result. Accordingly, the driver can prevent malfunction of the agricultural work vehicle 100 due to a work load by temporarily stopping driving of the working machine 200.

On the other hand, the first monitoring unit 180 according to the invention may further include a fifth comparator 370, a sixth comparator 410, a seventh comparator 420, eighth to nineteenth AND gates 510 to 620, and a third determination unit 460 as illustrated in FIG. 4 in order to determine whether there is an abnormality in the engine oil pressure.

The fifth comparator 400 compares the current amount of moisture in the fuel supplied to the engine 120 with a predetermined intra-fuel moisture upper-limit value. The fifth comparator 400 outputs a first value (for example, 1) when the current amount of moisture in the fuel is greater than the intra-fuel moisture upper-limit value, and outputs a second value (for example, 0) when the current amount of moisture in the fuel is not less than the intra-fuel moisture upper-limit value.

The sixth comparator 410 compares the current temperature of the fuel with a predetermined fuel temperature upper-limit value. The sixth comparator 410 outputs a first value (for example, 1) when the current temperature of the fuel is greater than the fuel temperature upper-limit value, and outputs a second value (for example, 0) when the current temperature of the fuel is not greater than the fuel temperature upper-limit value.

The seventh comparator 420 compares the current temperature of the fuel with a predetermined fuel temperature lower-limit value. The seventh comparator 420 outputs a first value (for example, 1) when the current temperature of the fuel is less than the fuel temperature lower-limit value, and outputs a second value (for example, 0) when the current temperature of the fuel is not less than the fuel temperature lower-limit value.

The eighth AND gate 510 performs an AND operation on the output of the fifth comparator 400 and the first comparator 310 and outputs the result of operation to the second determination unit 390. Specifically, the eighth AND gate 510 outputs a first value only when both the fifth comparator 400 and the first comparator 310 output the first value, and normally outputs a second value when any one of the fifth comparator 400 and the first comparator 310 outputs the second value.

The third determination unit 460 determines that an abnormality occurs in the engine when the first value is output from the eighth AND gate 510. That is, when the current temperature of the coolant is greater than the coolant temperature upper-limit value and the current amount of moisture in the fuel is greater than the intra-fuel moisture upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The ninth AND gate 520 performs an AND operation on the output of the fifth comparator 400 and the second comparator 320 and outputs the result of operation to the third determination unit 460. Specifically, the ninth AND gate 520 outputs a first value only when both the fifth comparator 400 and the second comparator 320 output the first value, and normally outputs a second value when any one of the fifth comparator 400 and the second comparator 320 outputs the second value.

At this time, the third determination unit 460 determines that an abnormality occurs in the engine when the first value is output from the ninth AND gate 520. That is, when the current load of the engine 120 is greater than the engine load upper-limit value and the current amount of moisture in the fuel is greater than the intra-fuel moisture upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The tenth AND gate 530 performs an AND operation on the output of the fifth comparator 400 and the third comparator 330 and outputs the result of operation to the third determination unit 460. Specifically, the tenth AND gate 530 outputs a first value only when both the fifth comparator 400 and the third comparator 330 output the first value, and normally outputs a second value when any one of the fifth comparator 400 and the third comparator 330 outputs the second value.

At this time, the third determination unit 460 determines that an abnormality occurs in the engine when the first value is output from the tenth AND gate 530. That is, when the current rotation speed of the engine 120 is greater than the engine rotation speed upper-limit value and the current amount of moisture in the fuel is greater than the intra-fuel moisture upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The eleventh AND gate 540 performs an AND operation on the output of the fifth comparator 400 and the fourth comparator 340 and outputs the result of operation to the third determination unit 460. Specifically, the eleventh AND gate 540 outputs a first value only when both the fifth comparator 400 and the fourth comparator 340 output the first value, and normally outputs a second value when any one of the fifth comparator 400 and the fourth comparator 340 outputs the second value.

At this time, the third determination unit 460 determines that an abnormality occurs in the engine when the first value is output from the eleventh AND gate 540. That is, when the current pressure of the engine oil is less than the engine oil pressure lower-limit value and the current amount of moisture in the fuel is greater than the intra-fuel moisture upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The twelfth AND gate 550 performs an AND operation on the output of the sixth comparator 410 and the first comparator 310 and outputs the result of operation to the third determination unit 460. Specifically, the twelfth AND gate 550 outputs a first value only when both the sixth comparator 410 and the first comparator 310 output the first value, and normally outputs a second value when any one of the sixth comparator 410 and the first comparator 310 outputs the second value.

The third determination unit 460 determines that an abnormality occurs in the engine when the first value is output from the twelfth AND gate 550. That is, when the current temperature of the coolant is greater than the coolant temperature upper-limit value and the current temperature of the fuel is greater than the fuel temperature upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The thirteenth AND gate 560 performs an AND operation on the output of the sixth comparator 410 and the second comparator 320 and outputs the result of operation to the third determination unit 460. Specifically, the thirteenth AND gate 560 outputs a first value only when both the sixth comparator 410 and the second comparator 320 output the first value, and normally outputs a second value when any one of the sixth comparator 410 and the second comparator 320 outputs the second value.

At this time, the third determination unit 460 determines that an abnormality occurs in the engine when the first value is output from the thirteenth AND gate 560. That is, when the current load of the engine is greater than the engine load upper-limit value and the current temperature of the fuel is greater than the fuel temperature upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The fourteenth AND gate 570 performs an AND operation on the output of the sixth comparator 410 and the third comparator 330 and outputs the result of operation to the third determination unit 460. Specifically, the fourteenth AND gate 570 outputs a first value only when both the sixth comparator 410 and the third comparator 330 output the first value, and normally outputs a second value when any one of the sixth comparator 410 and the third comparator 330 outputs the second value.

At this time, the third determination unit 460 determines that an abnormality occurs in the engine when the first value is output from the fourteenth AND gate 570. That is, when the current rotation speed of the engine 120 is greater than the engine rotation speed upper-limit value and the current temperature of the fuel is greater than the fuel temperature upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The fifteenth AND gate 580 performs an AND operation on the output of the sixth comparator 410 and the fourth comparator 370 and outputs the result of operation to the third determination unit 460. Specifically, the fifteenth AND gate 580 outputs a first value only when both the sixth comparator 410 and the fourth comparator 370 output the first value, and normally outputs a second value when any one of the sixth comparator 410 and the fourth comparator 370 outputs the second value.

At this time, the third determination unit 460 determines that an abnormality occurs in the engine when the first value is output from the fifteenth AND gate 580. That is, when the current pressure of the engine oil is less than the engine oil pressure lower-limit value and the current temperature of the fuel is greater than the fuel temperature upper-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The sixteenth AND gate 590 performs an AND operation on the output of the seventh comparator 420 and the first comparator 310 and outputs the result of operation to the third determination unit 460. Specifically, the sixteenth AND gate 590 outputs a first value only when both the seventh comparator 420 and the first comparator 310 output the first value, and normally outputs a second value when any one of the seventh comparator 420 and the first comparator 310 outputs the second value.

The third determination unit 460 determines that an abnormality occurs in the engine when the first value is output from the sixteenth AND gate 590. That is, when the current temperature of the coolant is greater than the coolant temperature upper-limit value and the current temperature of the fuel is less than the fuel temperature lower-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The seventeenth AND gate 600 performs an AND operation on the output of the seventh comparator 420 and the second comparator 320 and outputs the result of operation to the third determination unit 460. Specifically, the seventeenth AND gate 600 outputs a first value only when both the seventh comparator 420 and the second comparator 320 output the first value, and normally outputs a second value when any one of the seventh comparator 420 and the second comparator 320 outputs the second value.

At this time, the third determination unit 460 determines that an abnormality occurs in the engine when the first value is output from the seventeenth AND gate 600. That is, when the current load of the engine 120 is greater than the engine load upper-limit value and the current temperature of the fuel is less than the fuel temperature lower-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The eighteenth AND gate 610 performs an AND operation on the output of the seventh comparator 420 and the third comparator 330 and outputs the result of operation to the third determination unit 460. Specifically, the eighteenth AND gate 610 outputs a first value only when both the seventh comparator 420 and the third comparator 330 output the first value, and normally outputs a second value when any one of the seventh comparator 420 and the third comparator 330 outputs the second value.

At this time, the third determination unit 460 determines that an abnormality occurs in the engine when the first value is output from the eighteenth AND gate 610. That is, when the current rotation speed of the engine 120 is greater than the engine rotation speed upper-limit value and the current temperature of the fuel is less than the fuel temperature lower-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

The nineteenth AND gate 620 performs an AND operation on the output of the seventh comparator 420 and the fourth comparator 370 and outputs the result of operation to the third determination unit 460. Specifically, the nineteenth AND gate 620 outputs a first value only when both the seventh comparator 420 and the fourth comparator 370 output the first value, and normally outputs a second value when any one of the seventh comparator 420 and the fourth comparator 370 outputs the second value.

At this time, the third determination unit 460 determines that an abnormality occurs in the engine when the first value is output from the nineteenth AND gate 620. That is, when the current pressure of the engine oil is less than the engine oil pressure lower-limit value and the current temperature of the fuel is less than the fuel temperature lower-limit value due to work of the working machine 200, the third determination unit 460 determines that an abnormality occurs in the engine due to work of the working machine 200 and notifies the driver of the result. Accordingly, the driver can prevent malfunction of the agricultural work vehicle 100 due to a work load by temporarily stopping driving of the working machine 200.

Referring back to FIG. 1, the second monitoring unit 190 determines whether there is an abnormality in the agricultural work vehicle 100 based on general state information of the agricultural work vehicle 100. That is, the second monitoring unit 190 determines whether there is an abnormality in the agricultural work vehicle 100 based on general state information of the agricultural work vehicle 100 which is acquired in a general situation in which work is not performed by the working machine 200 (for example, in a state in which the agricultural work vehicle is traveling or stopped).

For example, when a voltage of the battery 170 is greater than a predetermined battery voltage upper-limit value or equal to or less than a predetermined battery voltage lower-limit value, the second monitoring unit 190 determines that an abnormality occurs in the battery 170 and notifies the driver of the result of determination.

For example, the second monitoring unit 190 may calculate a difference between a current temperature of the coolant acquired when work is not performed by the working machine 200 and an outside air temperature of a place in which the agricultural work vehicle 100 is located, determine that an abnormality occurs in the coolant temperature when the calculated difference departs from a predetermined normal range, and notify the driver of the result of determination.

For example, when a storage capacity of urea water departs from a predetermined normal range of a storage capacity of urea water, the second monitoring unit 190 may determine that an abnormality occurs in the storage capacity of urea water and notify the driver of the result of determination.

For example, when the urea water quality is greater than a predetermined urea water quantity upper-limit value or less than a predetermined urea water quality lower-limit value, the second monitoring unit 190 may determine that an abnormality occurs in the urea water quality and notify the driver of the result of determination.

On the other hand, the second monitoring unit 190 may determine whether expendables of the agricultural work vehicle 100 are to be replaced based on the state information, and notify the driver of the result of determination when there are expendables which are to be replaced.

In the above-mentioned embodiment, the first monitoring unit 180 or the second monitoring unit 190 notifies the driver of the result immediately when an abnormality occurs in the agricultural work vehicle 100. However, in a modified example, the first monitoring unit 180 or the second monitoring unit 190 may notify the driver of the result of determination when an abnormality in the agricultural work vehicle 100 is maintained for a predetermined time or occurs over predetermined times.

In the above-mentioned embodiment, the monitoring device 177 includes the first monitoring unit 180 and the second monitoring unit 190, but this configuration is only an example and the first monitoring unit 180 and the second monitoring unit 190 may be physically embodied as a single configuration.

Referring back to FIGS. 1 and 2, a working machine 200 is provided in the vehicle body 110 and performs agricultural work using a driving force which is generated by the engine 120. For example, the working machine 200 can be classified into a rear working machine 210 and a front working machine 220 depending on the position at which the working machine 200 is installed.

For example, when the agricultural work vehicle 100 is a tractor as illustrated in FIG. 2, the rear working machine 210 is attached to the rear of the vehicle body 110 (a direction of an arrow BD). The rear working machine 210 may be a backhoe working machine which is used to perform excavation work in the rear (the direction of the arrow BD) of the agricultural work vehicle 100.

On the other hand, the front working machine 220 is attached to the front (a direction of an arrow FD) of the vehicle body 110. The front working machine 220 may be a loader working machine which is used to transfer or move soil in the front (the direction of the arrow FD) of the agricultural work vehicle 100.

In the above-mentioned embodiment, the agricultural work vehicle 100 includes the monitoring device 177. However, in a modified example, the monitoring device 177 may be provided in a control server for remotely monitoring states of a plurality of agricultural work vehicles 100 in order to monitor the states of the plurality of agricultural work vehicles 100. A state monitoring system for an agricultural work vehicle according to the invention in which the monitoring device 177 is provided in the control server will be described below with reference to FIGS. 5 to 7.

Figure 5:
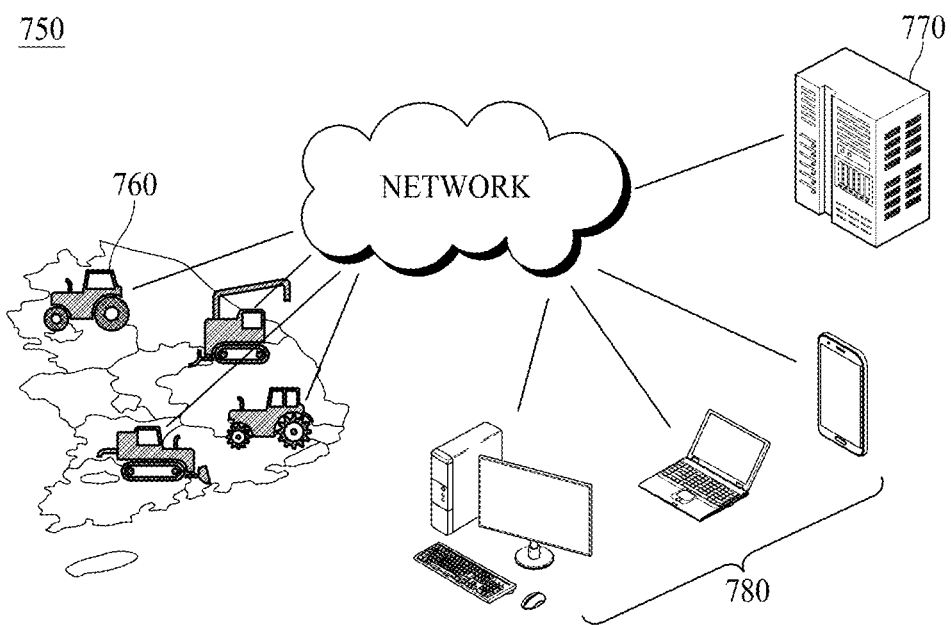
FIG. 5 is a diagram illustrating a configuration of a state monitoring system for an agricultural work vehicle according to an embodiment of the invention.

FIG. 5 is a diagram illustrating a con figuration of a state monitoring system for agricultural work vehicles according to an embodiment of the invention.

As illustrated in FIG. 5, the state monitoring system 750 for agricultural work vehicles includes a plurality of agricultural work vehicles 760, a control server 770, and a plurality of driver terminals 780.

A plurality of agricultural work vehicles 760 perform agricultural work using various working machines attached to the agricultural work vehicles 760 in a state in which they travel or stop on a farmland. For example, each agricultural work vehicle 760 may be a tractor or a combine.

Figure 6:
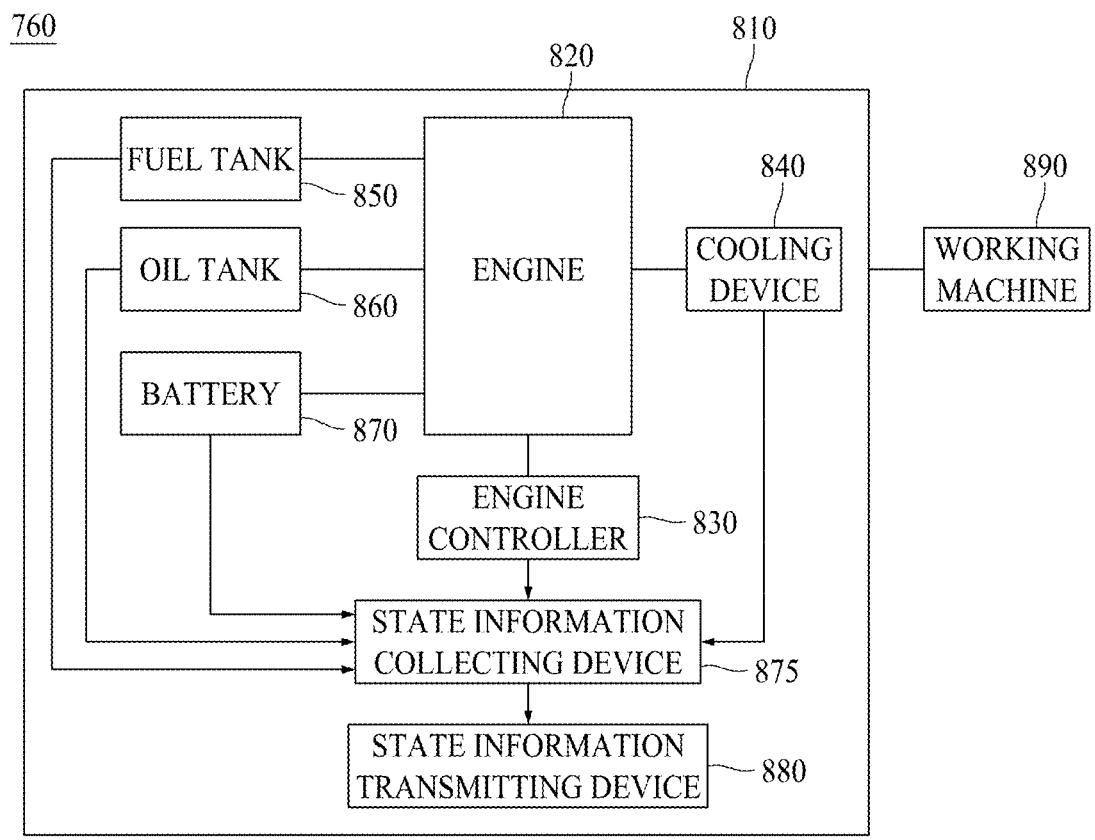
FIG. 6 is a block diagram schematically illustrating a configuration of the agricultural work vehicle illustrated in FIG. 5.

Hereinafter, the configuration of each agricultural work vehicle 760 illustrated in FIG. 5 will be more specifically described with reference to FIG. 6. As illustrated in FIG. 6, an agricultural work vehicle 760 includes a vehicle body 810, an engine 820, an engine controller 830, a cooling device 840, a fuel tank 850, an oil tank 860, a battery 870, a state information collecting device 875, a state information transmitting device 880, and a working machine 890.

The vehicle body 810 serves to support the engine 820, the engine controller 830, the cooling device 840, the fuel tank 850, the oil tank 860, the battery 870, the state information collecting device 875, the state information transmitting device 880, and the working machine 890. A driver seat (not illustrated) is provided in the vehicle body 810 in the same way as illustrated in FIG. 2. When a driver sits on the driver seat which is provided in the vehicle body 810 and operates a steering device (not illustrated), an operation device, or the like, the agricultural work vehicle 760 according to the invention can perform predetermined agricultural work. Wheels (not illustrated) are provided in the vehicle body 810. By allowing the engine 820 to rotate the wheels using fuel which is supplied from the fuel tank 850, the vehicle body 810 can move in a traveling direction (an X-axis direction). In this case, the traveling direction (the X-axis direction) may be an axial direction which is parallel to a forward direction in which the vehicle body 810 moves forward (a direction of an arrow FD) and a rearward direction in which the vehicle body 810 moves rearward (a direction of an arrow BD). Although not illustrated, a transmission that connects the engine 820 and the wheels may be provided in the vehicle body 810.

The engine 820 is provided in the vehicle body 810. The engine 820 generates a driving force for traveling of the vehicle body 810 and work of a working machine 890 using fuel which is supplied from the fuel tank 850. For example, the engine 820 is provided in the vehicle body 810 in a state in which it is accommodated in an engine accommodation section (not illustrated).

The engine controller 830 controls the engine 820 such that the engine 820 generates a driving force for traveling of the agricultural work vehicle 760 and work of a working machine 890. For example, the engine controller 830 supplies output information of the engine 820 to the state information collecting device 875 when the engine 820 is generating the driving force.

For example, the engine output information which is supplied to the state information collecting device 875 by the engine controller 830 includes an engine load and an engine rotation speed (RPM).

The cooling device 840 cools the engine 820 using a coolant and cools the coolant which has been heated by heat generated from the engine 820 using a radiator (not illustrated).

The fuel tank 850 is provided in the vehicle body 810. The fuel tank 850 stores fuel which is supplied to the engine 820.

The oil tank 860 is provided in the vehicle body 810. The oil tank 860 stores an engine oil which is supplied to the engine 820. The oil tank 860 continuously supplies and circulates a predetermined amount of engine oil to the engine 820. The engine oil forms a thin film in a slide portion such as a piston or a cylinder or a rotary portion such as a crankshaft or a bearing to decrease frictional resistance and performs a sealing function of sealing a small gap between a piston ring and a cylinder or the like to transmit energy to the crankshaft without any loss. The engine oil performs a cooling function of absorbing heat of a high-temperature portion while circulating in the engine 820 and also functions to prevent corrosion in the engine 820, to filter metal powder generated from the slide portion or the rotary portion using an oil filter, to prevent impurities such as carbon generated due to combustion of the fuel from be deposited in the slide portion or the rotary portion, and to clean the inside of the engine 820.

The battery 870 supplies electric energy for starting the engine 820 and supplies electric energy for driving electronic components which are mounted in the agricultural work vehicle 760.

The state information collecting device 875 collects state information of the agricultural work vehicle 100 and supplies the collected state information to the state information transmitting device 880. For example, the state information collected by the state information collecting device 875 includes a current temperature of a coolant, a current load of the engine 820, a current rotation speed of the engine 820, a current pressure of the engine oil, an amount of moisture in the fuel supplied to the engine 820, and a temperature of the fuel supplied to the engine 820 which are acquired when the working machine 760 performs work using the driving force of the engine 820.

The state information may further include an outside air temperature of a place in which the agricultural work vehicle 760 is located, a voltage of the battery 870, a level of urea water, and quality of urea water.

The state information transmitting device 880 transmits the state information of the agricultural work vehicle 760 acquired by the state information collecting device 875 to the control server 770. At this time, the state information transmitting device 880 can transmit the state information acquired by the state information collecting device 875 to the control server 770 in correlation with identification information of the agricultural work vehicle 760. For example, the identification information of the agricultural work vehicle 760 may be a vehicle identification number of the agricultural work vehicle 760 or an identification code which is individually given to the state information transmitting device 880. For example, the state information transmitting device 880 may be a radio communication module (for example, a 3G communication module or a 4G communication module).

The working machine 890 is provided in the vehicle body 810 and performs agricultural work using a driving force which is generated by the engine 820. For example, the working machine 890 can be classified into a rear working machine and a front working machine depending on the position at which the working machine 890 is installed. For example, when the agricultural work vehicle 760 is a tractor, the rear working machine may be a backhoe working machine which is attached to the rear of the vehicle body 810 and is used to perform excavation work. On the other hand, the front working machine may be a loader working machine which is attached to the front of the vehicle body 810 and is used to transfer or move soil.

Referring back to FIG. 5, the control server 770 receives state information of the agricultural work vehicles 760 from the agricultural work vehicles 760 and determines whether there is an abnormality in the agricultural work vehicles 760 based on the received state information. The control server 770 transmits the result of determination of whether there is an abnormality in each agricultural work vehicle 760 to the driver terminal 780 of the corresponding agricultural work vehicle 760.

Hereinafter, the configuration of the control server 770 according to the invention will be more specifically described with reference to FIG. 7.

Figure 7:
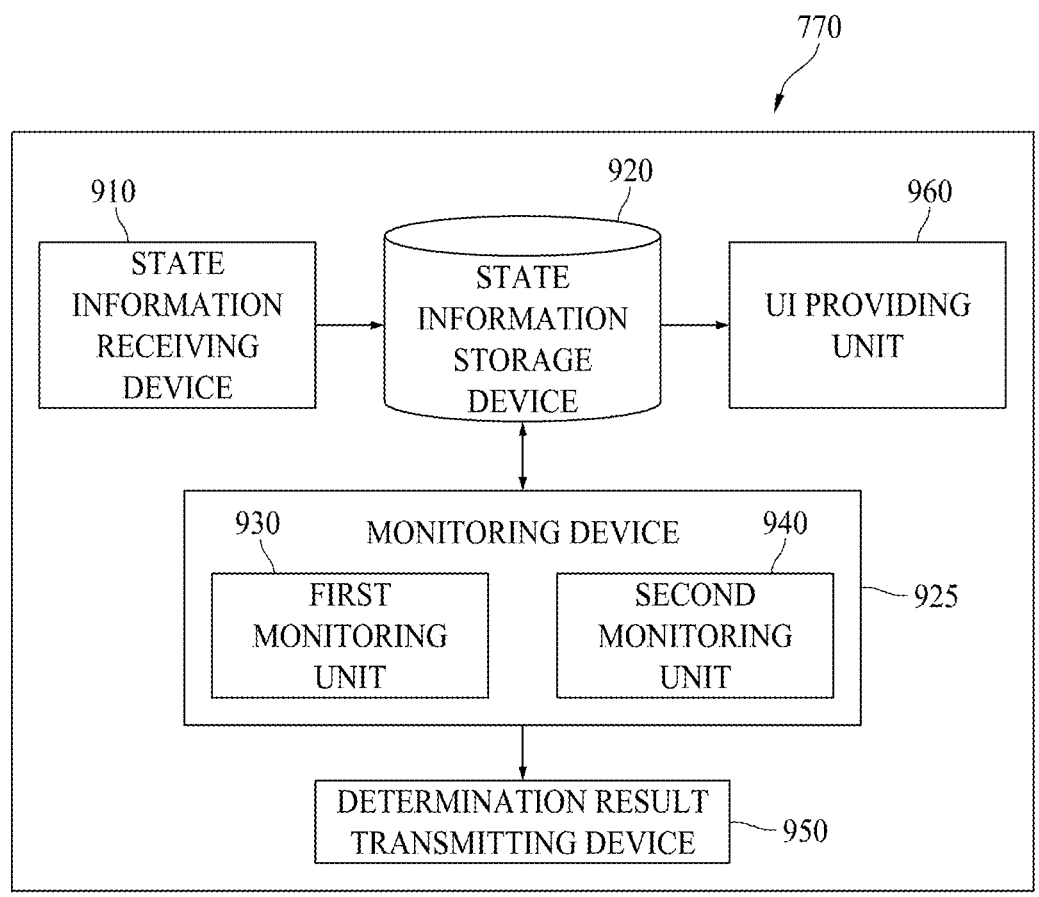
FIG. 7 is a block diagram schematically illustrating a configuration of a control server illustrated in FIG. 5.

FIG. 7 is a block diagram schematically illustrating the configuration of the control server according to an embodiment of the invention. As illustrated in FIG. 7, the control server 770 according to the embodiment of the invention includes a state information receiving device 910, a state information storage device 920, a monitoring device 925, a determination result transmitting device 950, and an UI providing unit 960.

The state information receiving device 910 receives state information of the agricultural work vehicles 760 from the agricultural work vehicles 760. The state information receiving device 910 stores the received state information in the state information storage device 920 along with identification information of the corresponding agricultural work vehicles 760. For example, the state information receiving device 910 may be a radio communication module (for example, a 3G communication module or a 4G communication module).

In the state information storage device 920, the state information of the agricultural work vehicles 760 is stored in correlation with the identification information of the corresponding agricultural work vehicles 760. At this time, the state information storage device 920 can store the state information of the agricultural work vehicles 760 in correlation with time information indicating the time at which the state information has been received and identification information of the driver terminals 780 of the corresponding agricultural work vehicles 760.

On the other hand, reference values of the state information for determining whether there is an abnormality in each agricultural work vehicle 760 are stored in the state information storage device 920. For example, the state information storage device 920 may store a coolant temperature upper-limit value, a coolant temperature lower-limit value, an engine load upper-limit value, an engine rotation speed upper-limit value, an engine oil pressure lower-limit value, an intra-fuel moisture upper-limit value, a fuel temperature upper-limit value, a fuel temperature lower-limit value, a normal range of a difference between the current temperature of the coolant and the outside air temperature, a battery voltage upper-limit value, a battery voltage lower-limit value, a normal range of a storage capacity of urea water, a urea water quantity upper-limit value, an urea water quality lower-limit value.

The results of determination of whether there is an abnormality in each agricultural work vehicle 760, which his generated by the monitoring device 925, is stored in the state information storage device 920 in correlation with the identification information of the corresponding agricultural work vehicle 760.

The monitoring device 925 determines whether there is an abnormality in each agricultural work vehicle 760 based on the state information which is acquired when the corresponding working machine 890 performs work or general state information which is transmitted from the corresponding agricultural work vehicle 760. For this purpose, the monitoring device 925 includes a first monitoring unit 930 and a second monitoring unit 940.

The first monitoring unit 930 determines at least one of whether there is an abnormality in the temperature of the coolant, whether there is an abnormality in the engine oil pressure, and whether there is an abnormality in the engine 820 based on the state information which is acquired when the working machine 890 of the corresponding agricultural work vehicle 760 performs work.

When it is determined that an abnormality occurs in the coolant temperature, an abnormality occurs in the engine oil pressure, or an abnormality occurs in the engine 820 while the working machine 890 is being driven, the first monitoring unit 930 stores the result of determination in the state information storage device 920 and transmits the result of determination to the corresponding driver terminal 780 via the determination result transmitting device 950.

For example, the first monitoring unit 930 can determine whether there is an abnormality in the coolant temperature using at least one of the current temperature of the coolant, the coolant temperature upper-limit value, the current load of the engine 820, the engine load upper-limit value, the current rotation speed of the engine 820, and the engine rotation speed upper-limit value for each agricultural work vehicle 760.

Specifically, the first monitoring unit 930 can determine that an abnormality occurs in the coolant temperature due to work of the working machine 890 of a specific agricultural work vehicle 760 when the current temperature of the coolant received from the agricultural work vehicle 760 is greater than the coolant temperature upper-limit value and the current load of the engine 820 is greater than the engine load upper-limit value.

The first monitoring unit 930 can determine that an abnormality occurs in the coolant temperature due to work of the working machine 890 of a specific agricultural work vehicle 760 when the current temperature of the coolant received from the agricultural work vehicle 760 is greater than the coolant temperature upper-limit value and the current rotation speed of the engine 820 is greater than the engine rotation speed upper-limit value.

For example, the first monitoring unit 930 can determine whether there is an abnormality in the engine oil pressure using at least one of the current pressure of the engine oil, the engine oil pressure lower-limit value, the current load of the engine 820, the engine load upper-limit value, the current rotation speed of the engine 820, and the engine rotation speed upper-limit value while the working machine 890 is performing work.

Specifically, the first monitoring unit 930 can determine that the engine oil pressure is low due to work of the working machine 890 of a specific agricultural work vehicle 760 when the current pressure of the engine oil received from the agricultural work vehicle 760 is less than the engine oil pressure lower-limit value and the current load of the engine 820 is greater than the engine load upper-limit value.

The first monitoring unit 930 can determine that the engine oil pressure is low due to work of the working machine 890 of a specific agricultural work vehicle 760 when the current pressure of the engine oil received from the agricultural work vehicle 760 is less than the engine oil pressure lower-limit value and the current rotation speed of the engine 120 is greater than the engine rotation speed upper-limit value.

For example, the first monitoring unit 930 can determine whether there is an abnormality in the engine oil pressure using at least one of the current temperature of the coolant, the coolant temperature upper-limit value, the current load of the engine 820, the engine load upper-limit value, the current rotation speed of the engine 820, the engine rotation speed upper-limit value, the current pressure of the engine oil, the engine oil pressure lower-limit value, the current amount of moisture in the fuel, the intra-fuel moisture upper-limit value, the current temperature of the fuel, the fuel temperature upper-limit value, and the fuel temperature lower-limit value while the working machine 890 is performing work.

Specifically, when it is determined that the current temperature of the coolant received from a specific agricultural work vehicle 760 is greater than the coolant temperature upper-limit value, the current load of the engine 820 is greater than the engine load upper-limit value, the current rotation speed of the engine 820 is greater than the engine rotation speed upper-limit value, or the current pressure of the engine oil is less than the engine oil pressure lower-limit value, and the current amount of moisture in the fuel is greater than the intra-fuel moisture upper-limit value, the first monitoring unit 930 can determine that an abnormality occurs in the engine 820 due to work of the working machine 890.

For example, the first monitoring unit 930 can be realized in the form of a program that can perform the above-mentioned functions. For example, the first monitoring unit 930 may be realized in the form of a circuit illustrated in FIG. 3 or 4. When the first monitoring unit 930 is realized in the form of a circuit, it is the same as described above with reference to FIG. 3 or 4 and thus specific description thereof will not be repeated.

The second monitoring unit 940 determines whether there is an abnormality in each agricultural work vehicle 760 based on general state information which is transmitted from the agricultural work vehicle 760. That is, the second monitoring unit 940 determines whether there is an abnormality in the agricultural work vehicle 760 based on the general state information of the agricultural work vehicle 760 which is acquired in a general situation in which the working machine 890 is not driven (for example, in a state in which the agricultural work vehicle is traveling or stopped).

For example, when a voltage of the battery 870 is greater than a predetermined battery voltage upper-limit value or less than a predetermined battery voltage lower-limit value, the second monitoring unit 940 determines that an abnormality occurs in the battery 870, stores the result of determination in the state information storage device 920, and notifies the driver terminal 780 of the corresponding agricultural work vehicle 760 of the result of determination via the determination result transmitting device 950.

For example, the second monitoring unit 940 may calculate a difference between a current temperature of the coolant acquired when the working machine 890 is not driven and an outside air temperature of a place in which the agricultural work vehicle 760 is located, determine that an abnormality occurs in the coolant of the agricultural work vehicle 760 when the calculated difference departs from a predetermined normal range, store the result of determination in the state information storage device 920, and notify the driver terminal 780 of the corresponding agricultural work vehicle 760 of the result of determination via the determination result transmitting device 950.

For example, when a storage capacity of urea water of the corresponding agricultural work vehicle 760 departs from a predetermined normal range of a storage capacity of urea water, the second monitoring unit 940 may determine that an abnormality occurs in the storage capacity of urea water, store the result of determination in the state information storage device 920, and notify the driver terminal 780 of the corresponding agricultural work vehicle 760 of the result of determination via the determination result transmitting device 950.

For example, when the urea water quality of the corresponding agricultural work vehicle 760 is greater than a predetermined urea water quantity upper-limit value or less than a predetermined urea water quality lower-limit value, the second monitoring unit 940 may determine that an abnormality occurs in the urea water quality, store the result of determination in the state information storage device 920, and notify the driver terminal 780 of the corresponding agricultural work vehicle 760 of the result of determination via the determination result transmitting device 950.

On the other hand, in the above-mentioned embodiment, when an abnormality occurs in an agricultural work vehicle 760, the second monitoring unit 940 notify the driver terminal 780 of the corresponding agricultural work vehicle 760 via the determination result transmitting device 950. However, in a modified example, the second monitoring unit 940 may notify the driver terminal 980 of the result of determination when an abnormality in the agricultural work vehicle 760 is maintained for a predetermined time or occurs predetermined times.

On the other hand, the second monitoring unit 940 may determine whether expendables of each agricultural work vehicle 760 are to be replaced based on the state information, and notify the driver terminal 780 of the result of determination when there are expendables which are to be replaced.

In the above-mentioned embodiment, the first monitoring unit 930 and the second monitoring unit 940 are separately provided, but this configuration is only an example and the first monitoring unit 930 and the second monitoring unit 940 may be physically embodied as a single configuration.

The determination result transmitting device 950 transmits the determination result from the monitoring device 925 to the driver terminal 780. For example, when the monitoring device 925 determines that an abnormality occurs in a specific agricultural work vehicle 760, the determination result transmitting device 950 acquires the identification number of the driver terminal 780 correlated with the corresponding agricultural work vehicle 760 from the state information storage device 920 and transmits the result of determination to the acquired identification number of the driver terminal 780.

For example, the determination result transmitting device 950 can be realized as a radio communication module (for example, a 3G communication module or a 4G communication module). In the above-mentioned embodiment, the state information receiving device 910 and the determination result transmitting device 950 are separate modules, but this configuration is only an example, and the state information receiving device 910 and the determination result transmitting device 950 may be embodied as a single module.

The UI providing unit 960 provides various UI screens for controlling the control server 770 to an operator of the control server 770. The operator of the control server 770 can ascertain the number of agricultural work vehicles 760 which are connected to the control server 770, the number of agricultural work vehicles 760 which are performing work, information and the number of agricultural work vehicles 760 which are to be subjected to periodic maintenance, information and the number of agricultural work vehicles 760 in which an abnormality occurs, information and the number of agricultural work vehicles 760 which are to be subjected to pre-check, and information and the number of agricultural work vehicles 760 which are to be subjected to post-check from the UI screens which are provided by the UI providing unit 960. When the operator of the control server 770 selects an agricultural work vehicle 760 in which an abnormality occurs, the UI providing unit 960 can provide abnormality details occurring in the agricultural work vehicle 760 to the operator of the control server 770 through a predetermined UI screen.

Referring back to FIG. 5, each driver terminal 780 is a terminal of a user who owns or driving the corresponding agricultural work vehicle 760 (hereinafter referred to as a "driver") and notifies the driver of the result of determination of whether there is an abnormality in the agricultural work vehicle 760 transmitted from the control server 770. For example, the driver terminal 780 can be realized by a smart watch, a smartphone, or a tablet PC, and an application for communication with the control server 770 may be mounted therein. In this example, the driver terminal 780 notifies the driver of the result of determination of whether there is an abnormality in the agricultural work vehicle 760, which is transmitted from the control server 770, via the application mounted therein.

A method of monitoring a state of an agricultural work vehicle according to an embodiment of the invention will be described below in brief with reference to FIG. 8.

FIG. 8 is a flowchart illustrating the method of monitoring a state of an agricultural work vehicle according to an embodiment of the invention.

As illustrated in FIG. 8, an agricultural work vehicle 760 acquires state information of the agricultural work vehicle 760 while a working machine attached to the agricultural work vehicle 760 is performing agricultural work (S800).

For example, the state information which is collected by the agricultural work vehicles 760 includes at least one of the current temperature of the coolant, the current load of the engine, the current rotation speed of the engine, the current pressure of the engine oil, the current amount of moisture in fuel supplied to the engine, and the current temperature of fuel supplied to the engine which are acquired when the working machine is performing work using a driving force generated by the engine. The state information which is collected by the agricultural work vehicle 760 may further include an outside air temperature of a place in which the agricultural work vehicle 760 is located, a battery voltage, a urea water level and urea water quality.

Thereafter, the agricultural work vehicle 760 transmits the state information of the agricultural work vehicle 760 collected in S800 to the control server 770 (S810). At this time, the agricultural work vehicle 760 can transmit the collected state information to the control server 770 in correlation with the identification information of the agricultural work vehicle 760. For example, the identification information of the agricultural work vehicle 760 may be a vehicle identification number of the agricultural work vehicle 760 or an identification code which is individually given to the state information transmitting device 880. For example, the state information transmitting device 880 may be a radio communication module (for example, a 3G communication module or a 4G communication module).

Thereafter, the control server 770 determines at least one of whether there is an abnormality in the coolant temperature of the agricultural work vehicle 760, whether there is an abnormality in the engine oil pressure, and whether there is an abnormality in the engine 820 (S820).

A specific method of causing the control server 770 to determine at least one of whether there is an abnormality in the coolant temperature of the agricultural work vehicle 760, whether there is an abnormality in the engine oil pressure, and whether there is an abnormality in the engine 820 is the same as described above for the first monitoring unit 930 and the second monitoring unit 940 and thus specific description thereof will not be repeated.

When it is determined that an abnormality has occurred, the control server 770 transmits the result of determination to the driver terminal 780 of the agricultural work vehicle 760 (S830). On the other hand, when it is determined in S820 that an abnormality has not occurred, the control server 770 additionally determines whether an abnormality occurs in the agricultural work vehicle based on new state information which is transmitted from the agricultural work vehicle 760. For example, even when it is determined in S820 that an abnormality has not occurred, the control server 770 may transmit the result of determination to the driver terminal 780 of the agricultural work vehicle.

Thereafter, the driver terminal 780 displays the result of determination received from the control server 770 for the driver (S840).

Those skilled in the art can understand that the invention can be embodied in various forms without changing the technical concept or essential features of the invention.

For example, a global positioning system (GPS) module for tracking the position of each agricultural work vehicle 760 is provided in each agricultural work vehicle 760, and the control server 770 can track the position of each agricultural work vehicle 760 using position information of the agricultural work vehicle 760 which is received from the GPS module. Accordingly, it is possible to prevent theft of the agricultural work vehicle 760.

The above-mentioned functions of the control server may be realized in the form of a program. In this case, the functions which are performed by the control server 770 can be embodied as a program and the program can be installed in a terminal in which computing resources capable of executing the program are mounted, whereby the functions can be realized.

Therefore, the embodiments described above should be understood to be exemplary, but not restrictive in all respects. The scope of the invention is defined by the claims which will be described later, not by the above detailed description, and it should be construed that all modifications which are derived from the concept and scope of the claims and equivalent concepts thereof are included in the scope of the invention.

[FIG. 1]
150 FUEL TANK
160 OIL TANK
170 BATTERY
120 ENGINE
140 COOLING DEVICE
130 ENGINE CONTROLLER
175 STATE INFORMATION COLLECTING DEVICE
177 MONITORING DEVICE
180 FIRST MONITORING UNIT
190 SECOND MONITORING UNIT
200 WORKING MACHINE
[FIG. 3]
CURRENT COOLANT TEMPERATURE
COOLANT TEMPERATURE UPPER-LIMIT VALUE
CURRENT ENGINE LOAD
ENGINE LOAD UPPER-LIMIT VALUE
CURRENT ENGINE ROTATION SPEED
ENGINE ROTATION SPEED UPPER-LIMIT VALUE
CURRENT ENGINE OIL PRESSURE
ENGINE OIL PRESSURE LOWER-LIMIT VALUE
360 FIRST DETERMINATION UNIT
390 SECOND DETERMINATION UNIT
CURRENT AMOUNT OF MOISTURE IN FUEL
INTRA-FUEL MOISTURE UPPER-LIMIT VALUE
CURRENT FUEL TEMPERATURE
FUEL TEMPERATURE UPPER-LIMIT VALUE
CURRENT FUEL TEMPERATURE
FUEL TEMPERATURE LOWER-LIMIT VALUE
460 THIRD DETERMINATION UNIT
[FIG. 4]
CURRENT COOLANT TEMPERATURE
COOLANT TEMPERATURE UPPER-LIMIT VALUE
CURRENT ENGINE LOAD
ENGINE LOAD UPPER-LIMIT VALUE
CURRENT ENGINE ROTATION SPEED
ENGINE ROTATION SPEED UPPER-LIMIT VALUE
CURRENT ENGINE OIL PRESSURE
ENGINE OIL PRESSURE LOWER-LIMIT VALUE
360 FIRST DETERMINATION UNIT
390 SECOND DETERMINATION UNIT
CURRENT AMOUNT OF MOISTURE IN FUEL
INTRA-FUEL MOISTURE UPPER-LIMIT VALUE
CURRENT FUEL TEMPERATURE
FUEL TEMPERATURE UPPER-LIMIT VALUE
CURRENT FUEL TEMPERATURE
FUEL TEMPERATURE LOWER-LIMIT VALUE
460 THIRD DETERMINATION UNIT
[FIG. 5]
NETWORK
[FIG. 6]
850 FUEL TANK
860 OIL TANK
870 BATTERY
820 ENGINE
840 COOLING DEVICE

830 ENGINE CONTROLLER
875 STATE INFORMATION COLLECTING DEVICE
880 STATE INFORMATION TRANSMITTING DEVICE
890 WORKING MACHINE
[FIG. 7]
910 STATE INFORMATION RECEIVING DEVICE
920 STATE INFORMATION STORAGE DEVICE
960 UI PROVIDING UNIT
925 MONITORING DEVICE
930 FIRST MONITORING UNIT
940 SECOND MONITORING UNIT
950 DETERMINATION RESULT TRANSMITTING DEVICE
[FIG. 8]
760 AGRICULTURAL WORK VEHICLE
S800 ACQUIRE STATE INFORMATION OF AGRICULTURAL WORK VEHICLE WHEN WORKING MACHINE ATTACHED TO AGRICULTURAL WORK VEHICLE PERFORMS AGRICULTURAL WORK
S810: TRANSMIT COLLECTED STATE INFORMATION OF AGRICULTURAL WORK VEHICLE
770 CONTROL SERVER
S820 DETERMINE WHETHER THERE IS ABNORMALITY IN COOLANT TEMPERATURE OF AGRICULTURAL WORK VEHICLE, WHETHER THERE IS ABNORMALITY IN ENGINE OIL PRESSURE, AND WHETHER THERE IS ABNORMALITY IN ENGINE WHEN WORKING MACHINE PERFORMS WORK BASED ON STATE INFORMATION TRANSMITTED FROM AGRICULTURAL WORK VEHICLE
ABNORMALITY X
ABNORMALITY O
S830 TRANSMIT RESULT OF DETERMINATION
780 DRIVER TERMINAL
S840 DISPLAY RECEIVED RESULT OF DETERMINATION TO DRIVER

The invention claimed is:

1. An agricultural work vehicle comprising:
a vehicle body;
a working machine that is attached to the front or rear of the vehicle body and performs agricultural work;
an engine that generates a driving force for movement of the vehicle body and work of the working machine; and
a monitoring device that determines at least one of whether there is an abnormality in a temperature of a coolant for cooling the engine, whether there is an abnormality in a pressure of an engine oil supplied to the engine, and whether there is an abnormality in the engine when the working machine performs work using the driving force,
wherein the monitoring device calculates a difference between an outside air temperature of a place in which the agricultural work vehicle is located and a current temperature of the coolant and determines that an abnormality occurs in the temperature of the coolant when the difference departs from a predetermined normal range.

2. The agricultural work vehicle according to claim 1, wherein the monitoring device determines that an abnormality occurs in the temperature of the coolant to the work of the working machine when a current temperature of the coolant is greater than a coolant temperature upper-limit value and a current load of the engine is greater than an engine load upper-limit value or a current rotation speed of the engine is greater than an engine rotation speed upper-limit value at the time of work of the working machine.

3. The agricultural work vehicle according to claim 1, wherein the monitoring device determines that an abnormality occurs in the pressure of the engine oil due to the work of the working machine when a current pressure of the engine oil is less than an engine oil lower-limit value and a current load of the engine is greater than an engine load upper-limit value or a current rotation speed of the engine is greater than an engine rotation speed upper-limit value at the time of work of the working machine using the driving force.

4. The agricultural work vehicle according to claim 1, wherein the monitoring device determines that an abnormality occurs in the engine due to the work of the working machine when a determination is made that an amount of moisture included in fuel is greater than an intra-fuel moisture upper-limit value or a current temperature of the fuel is greater than a fuel temperature upper-limit value or the current temperature of the fuel is less than a fuel temperature lower-limit value, and a current temperature of the coolant is greater than a coolant temperature upper-limit value or a current load of the engine is greater than an engine load upper-limit value or a current rotation speed of the engine is greater than an engine rotation speed upper-limit value or a current pressure of the engine oil is less than an engine oil pressure lower-limit value at the time of work of the working machine using the driving force.

5. A system for monitoring a state of an agricultural work vehicle, the system comprising:
a state information receiving device that receives state information of an agricultural work vehicle from one or more agricultural work vehicles when a working machine attached to the agricultural work vehicle performs agricultural work;
a monitoring device that determines at least one of whether there is an abnormality in a temperature of a coolant for the agricultural work vehicle, whether there is an abnormality in a pressure of an engine oil, and whether there is an abnormality in an engine when the working machine performs work based on the state information; and
a determination result transmitting device that transmits a result of determination to a driver terminal of the agricultural work vehicle when a determination is made that an abnormality occurs in at least one of the temperature of the coolant, the pressure of the engine oil, and the engine,
wherein the monitoring device calculates a difference between an outside air temperature of a place in which the agricultural work vehicle is located and a current temperature of the coolant and determines that an abnormality occurs in the temperature of the coolant when the difference departs from a predetermined normal range.

6. The system for monitoring a state of an agricultural work vehicle according to claim 5, wherein the state information includes at least one of the current temperature of the coolant, a current load of the engine, a current engine rotation speed of the engine, a current pressure of the engine oil, an amount of moisture in fuel supplied to the engine, and a current temperature of the fuel which are acquired when the working machine performs work.

7. A method for monitoring a state of an agricultural work vehicle, the method comprising:
causing an agricultural work vehicle to acquire state information of the agricultural work vehicle when a working machine attached to the agricultural work vehicle performs agricultural work;

causing the agricultural work vehicle to transmit the state information of the agricultural work vehicle to a control server ;

causing the control server to determine at least one of whether there is an abnormality in a temperature of a coolant for the agricultural work vehicle, whether there is an abnormality in a pressure of an engine oil, and whether there is an abnormality in an engine when the working machine performs work based on the state information;

causing the control server to transmit a result of determination to a driver terminal of the agricultural work vehicle when a determination is made that an abnormality occurs in at least one of the temperature of the coolant, the pressure of the engine oil, and the engine; and causing the driver terminal to display the result of determination received from the control server to a driver, wherein a difference between an outside air temperature of a place in which the agricultural work vehicle is located and a current temperature of the coolant is calculated and a determination is made that an abnormality occurs in the temperature of the coolant when the difference departs from a predetermined normal range.

\* \* \* \* \*